United States Patent
Han

(10) Patent No.: US 9,813,166 B2
(45) Date of Patent: Nov. 7, 2017

(54) GATEWAY APPARATUS, WIRELESS COMMUNICATION PROVIDING METHOD THEREOF, AND NETWORK SYSTEM

(71) Applicant: Samsung Electronics Co. Ltd., Suwon-si, Gyeonggi-do (KR)

(72) Inventor: Chung-suk Han, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 14/027,662

(22) Filed: Sep. 16, 2013

(65) Prior Publication Data

US 2014/0085060 A1    Mar. 27, 2014

(30) Foreign Application Priority Data

Sep. 26, 2012    (KR) ........................ 10-2012-0107241

(51) Int. Cl.
*H04B 15/00*    (2006.01)
*H04W 16/14*    (2009.01)

(52) U.S. Cl.
CPC ............ *H04B 15/00* (2013.01); *H04W 16/14* (2013.01)

(58) Field of Classification Search
CPC ..... H04B 15/00; H04W 72/082; H04W 16/14
USPC ......... 340/12.5; 455/509, 512, 513; 370/329
See application file for complete search history.

(56) References Cited

U.S. PATENT DOCUMENTS

| | | | | |
|---|---|---|---|---|
| 5,295,138 A * | 3/1994 | Greenberg | ............. | H04Q 11/02 370/201 |
| 6,018,528 A * | 1/2000 | Gitlin | ................... | H04B 7/2618 370/436 |
| 6,661,781 B1 * | 12/2003 | Chitre | ..................... | H03M 7/30 370/330 |
| 8,879,527 B1 * | 11/2014 | Venkatesh | ............... | H04W 4/00 370/338 |
| 2002/0155811 A1 * | 10/2002 | Prismantas | .......... | H04B 1/1027 455/63.1 |
| 2004/0028011 A1 * | 2/2004 | Gehring | ................. | H04B 1/719 370/330 |
| 2004/0125779 A1 * | 7/2004 | Kelton | ................... | H04W 72/12 370/338 |
| 2005/0059396 A1 * | 3/2005 | Chuah | ................... | H04W 24/02 455/435.1 |
| 2005/0220131 A1 * | 10/2005 | Ginzburg | ............ | H04L 12/1868 370/432 |
| 2006/0003799 A1 | 1/2006 | Dawood et al. | | |

(Continued)

*Primary Examiner* — Edwin Holloway, III
(74) *Attorney, Agent, or Firm* — Jefferson IP Law, LLP

(57) ABSTRACT

A gateway apparatus for wireless communication is provided. The gateway apparatus includes an interface to which a plurality of electronic devices within a first range connect wirelessly, and a controller configured to provide a communication connection using a frequency band to each of the plurality of electronic devices so that each of the electronic devices connected to the interface is enabled for wireless communication, to split the frequency band into a plurality of bands respectively corresponding to the plurality of electronic devices connected to the interface when it is determined that communication interference occurs between the electronic devices, and to allocate the split bands to the respective electronic devices to control the electronic devices to perform communications through the split bands.

18 Claims, 4 Drawing Sheets

(56) References Cited

U.S. PATENT DOCUMENTS

| | | | |
|---|---|---|---|
| 2007/0208864 A1* | 9/2007 | Flynn | H04L 63/02 709/227 |
| 2008/0253319 A1* | 10/2008 | Ji | H04W 16/02 370/328 |
| 2009/0028098 A1* | 1/2009 | Gates | H01Q 1/007 370/329 |
| 2009/0154380 A1 | 6/2009 | LeBlanc | |
| 2011/0299488 A1 | 12/2011 | Kim et al. | |
| 2012/0179796 A1 | 7/2012 | Nagaraj et al. | |
| 2012/0224612 A1* | 9/2012 | Kim | H04L 1/0003 375/219 |
| 2012/0236906 A1 | 9/2012 | Binder et al. | |

\* cited by examiner

FIG. 3

| DEVICE NAME | DEVICE TYPE | BAND (Hz) | BAND WIDTH (Hz) |
|---|---|---|---|
| FIRST ELECTRONIC DEVICE | BLU-RAY PLAYER | 2400 ~ 2405 | 5 |
| SECOND ELECTRONIC DEVICE | TV | 2410 ~ 2420 | 10 |
| THIRD ELECTRONIC DEVICE | MOBILE PHONE | 2422 ~ 2430 | 8 |
| FOURTH ELECTRONIC DEVICE | REFRIGERATOR | 2435 ~ 2440 | 5 |
| FIFTH ELECTRONIC DEVICE | AIR CONDITIONER | 2442 ~ 2445 | 3 |
| SIXTH ELECTRONIC DEVICE | VACUUM CLEANER | 2450 ~ 2455 | 5 |
| SEVENTH ELECTRONIC DEVICE | COMPUTER | 2460 ~ 2480 | 20 |

GATEWAY APPARATUS, WIRELESS COMMUNICATION PROVIDING METHOD THEREOF, AND NETWORK SYSTEM

CROSS-REFERENCE TO RELATED APPLICATION(S)

This application claims the benefit of a Korean patent application filed on Sep. 26, 2012 in the Korean Intellectual Property Office and assigned Serial No. 10-2012-0107241, the entire disclosure of which is hereby incorporated by reference.

TECHNICAL FIELD

The present disclosure relates to a gateway apparatus and method for providing wireless communications to various electronic devices. More particularly, the present disclosure relates to a gateway apparatus and method for minimizing communication interference which may occur between a plurality of electronic devices constituting a wireless local area network.

BACKGROUND

The term "electronic device" collectively refers to an apparatus capable of performing various user required functions by controlling the transfer of electrons using energy such as electricity. For instance, electronic devices with different forms and characteristics, such as home appliances including a washing machine, a refrigerator and a dish washer, Audio/Video (A/V) devices including a set-top box, an optical media reproduction system, and a Television (TV), and mobile devices including a Personal Computer (PC), a mobile phone, and a portable media player, are provided at ordinary users' houses to meet demands of the users.

In response to technological advancement and expanding demands of users, electronic devices not only serve a single individual function but are developing to perform diverse functions in addition to their unique functionalities. For example, electronic devices are able to form a network for data communications with each other, thereby providing users with sophisticated and diverse functions through communication association or function sharing. Such an example includes a network system constituted by electronic devices within a limited range, e.g., a home network.

In building such a network system, a radio communication system, which is relatively easy to install, is more frequently adopted than a wire-based network system susceptible to environments in installation. However, various issues such as differences in communication standards, association with a different communication network, occupation of a communication channel, communication interference, and differences from wire-based communications need to be addressed to secure wireless communication quality of an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

An aspect of the present disclosure is to provide a gateway apparatus for wireless communication. The gateway apparatus includes an interface to which a plurality of electronic devices within a first range connect wirelessly, and a controller configured to provide a communication connection using a frequency band to each of the plurality of electronic devices so that each of the plurality of electronic devices connected to the interface is enabled for wireless communication, to split the frequency band into a plurality of bands respectively corresponding to the plurality of electronic devices connected to the interface when it is determined that communication interference occurs between the electronic devices, and to allocate the split bands to the respective electronic devices to control the electronic devices to perform communications through the split bands.

The controller may set up different widths of the split bands for the respective electronic devices based on communication usage of each electronic device.

The communication usage of an electronic device may include a communication traffic level of the electronic device, and the controller may set up a broader width of a split band for an electronic device with a higher communication traffic level than that of a split band for an electronic device with a lower communication traffic level.

The plurality of split bands may be set up to have non-overlapping frequencies.

The controller may determine that the communication interference occurs when a number of electronic devices connected to the interface is greater than a threshold value.

The interface may be able to communicate with at least one different gateway apparatus, and the controller may determine that the communication interference occurs when a number of electronic devices connected to the interface and the at least one different gateway apparatus is greater than a threshold value.

When it is determined that the communication interference between the electronic devices does not occur while communication is provided through the split bands allocated to the electronic devices, the controller may provide communication in a state that the allocation of the split bands is cancelled.

When a new electronic device is connected to the interface while communication is provided through the split bands allocated to the electronic devices, the controller may split and allocate the frequency band again.

The frequency band may include an Industrial, Scientific and Medical (ISM) radio band of 2.4 GHz, an Orthogonal Frequency Division multiplexing (OFDM) frequency band of 5 GHz, and the like.

Another aspect of the present invention is to provide a network system. The network system includes a plurality of electronic devices, and a gateway apparatus configured to provide a communication connection using a frequency band to each of the plurality of electronic devices within a first range so that each of the plurality of electronic devices is enabled for wireless communication, wherein the gateway apparatus splits the frequency band into a plurality of bands respectively corresponding to the plurality of electronic devices when it is determined that communication interference occurs between the electronic devices in connection, and allocates the split bands to the respective electronic devices to control the electronic devices to perform communications through the split bands.

When at least one of the plurality of electronic devices is no longer in the first range where the gateway apparatus provides the communication connection while the communications are carried out through the split bands, the allocation of the split bands may be canceled and each of the remaining electronic devices within the first range performs a communication connection to a different gateway apparatus using the entire frequency band.

Another aspect of the present invention is to provide a wireless communication method of a gateway apparatus. The method includes providing a communication connection using a frequency band to each of a plurality of electronic devices connected within a first range so that each of the plurality of electronic devices is enabled for wireless communication, splitting the frequency band into a plurality of bands respectively corresponding to the plurality of electronic devices when it is determined that communication interference occurs between the electronic devices, and allocating the split bands to the respective electronic devices to control the electronic devices to perform communications through the split bands.

The splitting of the frequency band may include setting up different widths of the split bands for the respective electronic devices based on communication usage of each electronic device.

The communication usage of the electronic device may include a communication traffic level of the electronic device, and the setting up of the different widths of the split bands may include setting up a broader width of a split band for an electronic device with a relatively high communication traffic level than that of a split band for an electronic device with a relatively low communication traffic level.

The plurality of split bands may be set up to have non-overlapping frequencies.

The splitting may determine that the communication interference occurs when a number of electronic devices connected within the first range is greater than a threshold value.

The gateway apparatus may be able to communicate with at least one different gateway apparatus, and the splitting may determine that the communication interference occurs when a number of electronic devices connected to the gateway apparatus and the at least one different gateway apparatus is greater than a threshold value.

The controlling may include providing communication in a state that the allocation of the split bands is cancelled when it is determined that the communication interference between the electronic devices does not occur while communication is provided through the split bands allocated to the electronic devices.

The controlling may include splitting and allocating the frequency band again when a new electronic device is connected while communication is provided through the split bands allocated to the electronic devices.

The present frequency band may include an Industrial, Scientific and Medical (ISM) radio band of 2.4 GHz, an Orthogonal Frequency Division Multiplexing (OFDM) frequency band of 5 GHz, and the like.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects features, and advantages of certain embodiments of the present disclosure will be more apparent from the following description taken in conjunction with the accompanying drawings, in which:

FIG. 3 illustrates a sub-band allocation for each of a plurality of electronic devices, such as the electronic devices in the system of FIG. 1, according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
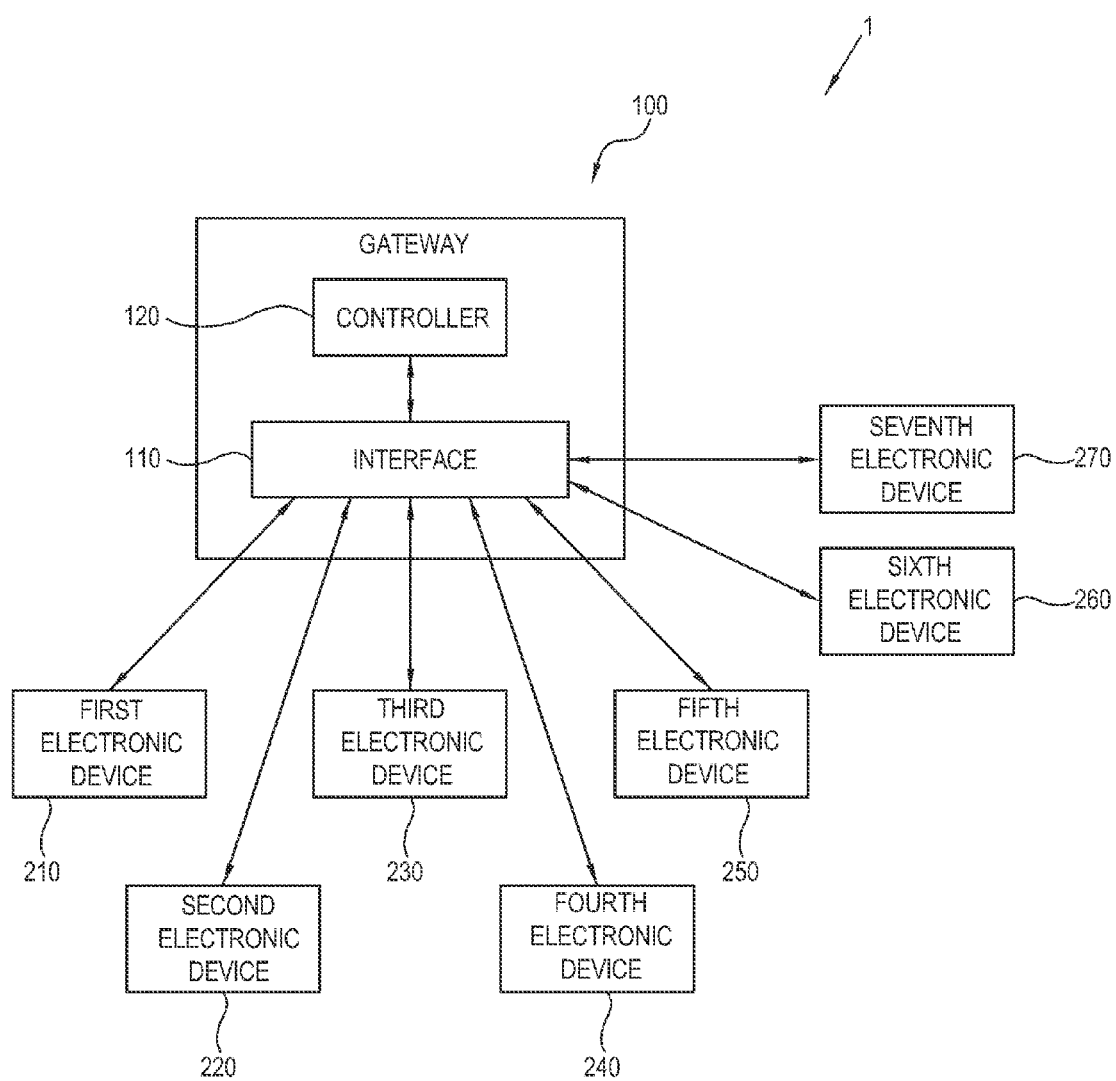
FIG. 1 illustrates a wireless network system according to an embodiment of the present disclosure.

FIG. 1 illustrates a wireless network system according to an embodiment of the present disclosure.

Referring to FIG. 1, the wireless network system 1 is configured such that one or more electronic devices 210, 220, 230, 240, 250, 260 and 270 are wirelessly connected to a gateway 100. The electronic devices 210 to 270 may communicate with each other or with an external wide area network via the gateway 100.

The electronic devices 210 to 270 may include any electronic apparatus, such as home appliances including a washing machine, a refrigerator, a dish washer, and the like, Audio/Video (A/V) devices such as a set-top box, an optical media reproduction system, a Television (TV), and the like, and mobile devices such as a Personal Computer (PC), a mobile phone, a portable media player, and the like without being limited to particular kinds and characteristics.

The gateway 100 connects one or more of the electronic devices 210 to 270 and a network, such as a Local Area Network (LAN), to another network for communications. A network transmits data in accordance with a communication protocol, and each network may use a different protocol. When different networks are directly connected to each other, communications between the networks are impossible. In this case, the gateway 100 connects any one network to another network, thereby enabling communications between the networks.

The gateway 100 may be similar to a router. The router serves to transmit a data packet to a different network and to search for an optimal network path. The router corresponds to the gateway 100 in that it connects a plurality of different networks.

The gateway 100 includes an interface 110 which the electronic devices 210 to 270 in the system 1 and a network outside the system 1 connect to and a controller 120 to control operations of the gateway 100.

The interface 110 connects with the electronic devices 210 to 270 via a cable or wirelessly for communications. In an embodiment, the interface 110 connects to the electronic devices 210 to 270 in accordance with a wireless communication mode, for example, Bluetooth, Wi-Fi, Zigbee, and the like. The interface 110 in the wireless communication mode has a limited range of communication with the electronic devices 210 to 270 based on a physical distance from the electronic devices 210 to 270, and thus the electronic devices 210 to 270 within the limited range and the gateway 100 form a wireless communication system 1 with the limited range.

In an embodiment, the controller 120 is configured as a Printed Circuit Board (PCB) on which a chipset, a Central Processing Unit (CPU), a semiconductor component and a circuit are mounted or formed and is responsible for operations of the gateway 100. The controller 120 performs various networking processes to support communication between the electronic devices 210 to 270 or between the electronic devices 210 to 270 and an external network. For example, the controller 120 controls a transmission speed and communication traffic, and converts an address in a network, a protocol and a bandwidth.

The electronic devices 210 to 270 use a frequency band for wireless connection to the gateway 100. The frequency band may be an Industrial, Scientific and Medical (ISM) radio band of 2.4 GHz, an Orthogonal Frequency Division Multiplexing (OFDM) frequency band of 5 GHz, and the like.

The ISM radio band is a frequency band for short-range communications or measurement for industrial, scientific and medical equipment and may be easily accessible without any complicated authentication. The ISM radio band is stipulated to be usable for a short distance, for example, a transmission range of dozens of meters or shorter, and thus is often adopted for short-range communications.

OFDM refers to a method of modulating a high-speed transmission signal on a plurality of orthogonal narrowband sub-carriers. OFDM is a multi-carrier transmission scheme of transmitting a data stream in parallel and simultaneously on a plurality of sub-channels. Thus, OFDM is a multiplexing technique in that a high-speed original data stream of one channel is simultaneously transmitted on multiple channels. Also, OFDM is a modulation technique in that a data stream is divided and carried by multiple sub-carriers.

The gateway 100 provides such a wireless communication connection using a frequency band to the electronic devices 210 to 270, so that the electronic devices 210 to 270 may communicate with each other or with the external network.

For example, when each of the electronic devices 210 to 270 connect to the gateway 100 using a 2.4 GHz ISM frequency band, the electronic devices 210 to 270 split the 2.4 GHz frequency band into bands according to a connection protocol with respect to the gateway 100 and select a split band at random to connect to the gateway 100 for communication. In an embodiment, the electronic devices 210 to 270 may split the frequency band into dozens of bands. Moreover, the 2.4 GHz frequency band may be divided into different widths of bands and different numbers depending on communication protocols.

However, based on the above described process, as the number of electronic devices 210 to 270 that are connected to the gateway 100 increases, the amount of communication interference between the electronic devices 210 to 270 also increases.

Generally, communication quality is higher when a band used by any one of the electronic devices 210 to 270 is not used by a different electronic device 210 to 270. On the other hand, when two or more electronic devices 210 to 270 use the same band, communication interference occurs and deteriorates the communication quality. Furthermore, bands used by two or more electronic devices 210 to 270 may overlap at a particular time point, which causes interference at that time point, and such a phenomenon becomes more serious as more electronic devices 210 to 270 are connected to the gateway 100. This is of concern because communication interference between the electronic devices 210 to 270 may decrease communication efficiency of the entire system 1.

To sum up, when a plurality of electronic devices 210 to 270 use the same ISM frequency band within a certain range, communication interference between the electronic devices 210 to 270 occurs and becomes more severe as the number of electronic devices 210 to 270 increases.

To minimize such communication interference in the system 1, the present embodiment discloses the following method/structure.

First, the controller 120 provides a communication connection using a certain frequency band, for example, a 2.4 GHz ISM frequency band to the electronic devices 210 to 270 so that the electronic devices 210 to 270 connected to the interface 110 are enabled for wireless communication. In this case, a band used by an electronic device 210 to 270 may overlap with a band used by a different electronic device 210 to 270 while conducting communications. That is, the gateway 100 does not restrict how the electronic devices 210 to 270 use the ISM frequency band for communications in providing the communication connection using the ISM frequency band, and thus the controller 120 operates as described above in a normal mode.

When it is determined that communication interference occurs between the electronic devices 210 to 270 connected to the interface 110, the controller 120 splits the ISM frequency band into a plurality of bands respectively corresponding to the electronic devices 210 to 270 and allocates the split bands to the electronic devices 210 to 270, respectively. The controller 120 controls the electronic devices 210 to 270 to perform communications through the respective split bands. This operation is referred to as a band split mode.

That is, when it is determined that communication interference between the electronic devices 210 to 270 connected to the interface 110 does not occur or is relatively insignificant, the controller 120 operates in the normal mode. When it is determined that communication interference between the electronic devices 210 to 270 connected to the interface 110 occurs or is relatively substantial, the controller 120 operates in the band split mode. Further, when it is determined that communication interference does not occur or is relatively insignificant while operating in the band split mode, the controller 120 returns to the normal mode and operates.

Hereinafter, an operating process in the band split mode will be described with reference to FIG. 2.

Figure 2:
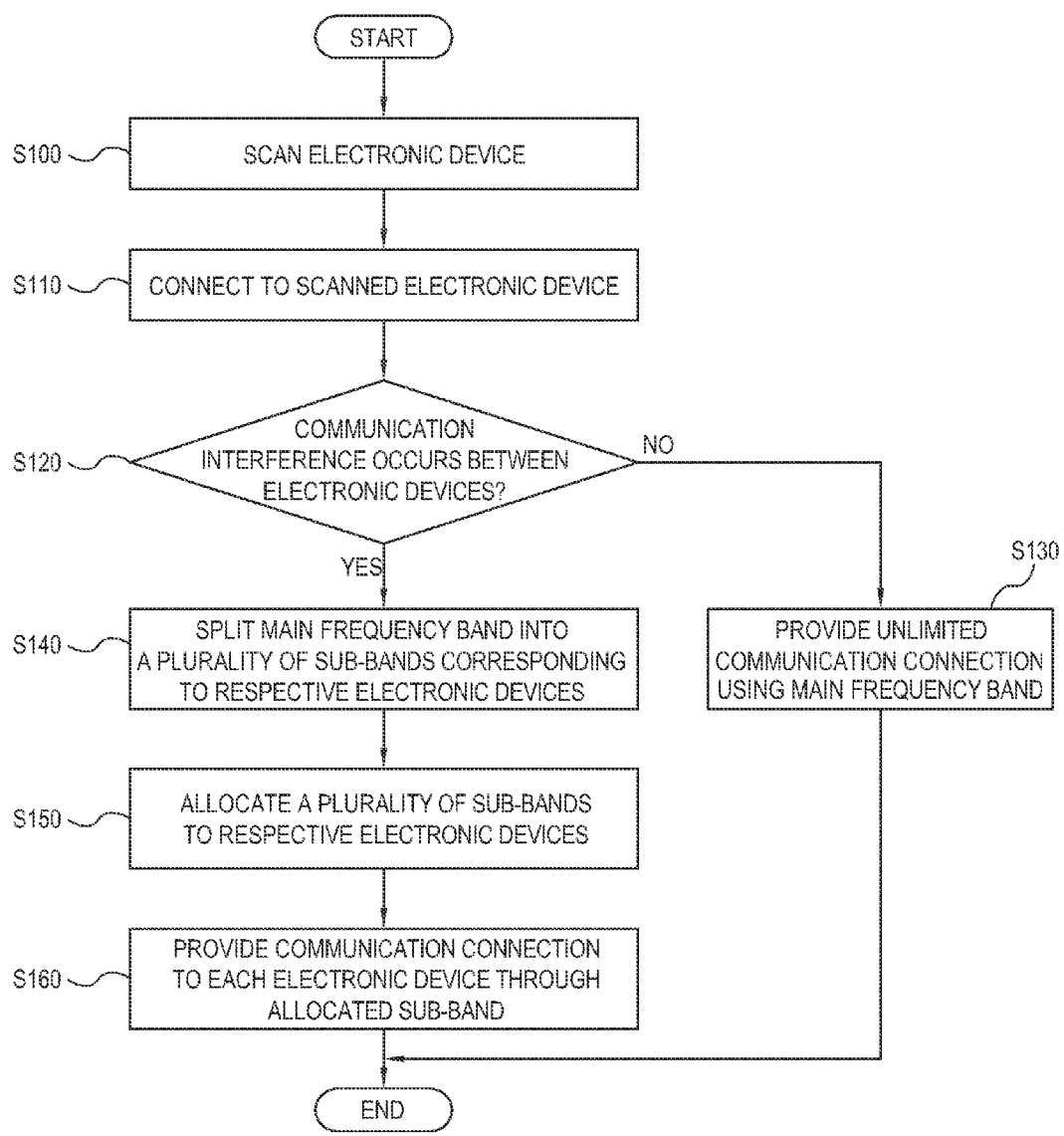
FIG. 2 is a flowchart illustrating a control method of a gateway, such as the gateway in the system of FIG. 1, according to an embodiment of the present disclosure.

FIG. 2 is a flowchart illustrating a control method of a gateway, such as the gateway in the system of FIG. 1, according to an embodiment of the present disclosure.

Referring to FIG. 2, the gateway 100 scans the electronic devices 210 to 270 within a communication range to provide initial communication connection at operation S100. When the electronic devices 210 to 270 are detected within the communication range through scanning, the gateway 100 connects to the electronic devices 210 to 270 for communications at operation S110.

The gateway 100 determines whether communication interference occurs between the connected electronic devices 210 to 270 at operation S120. Various configurations may be used for the determination at operation S120. For example, the gateway 100 may determine that communication interference occurs when a number of connected electronic devices 210 to 270 is greater than a threshold value. Alternatively, the gateway 100 may initially operate in the normal mode, and determine that communication interference occurs when total traffic in the system is greater than a threshold level.

When it is determined that communication interference does not occur between the electronic devices 210 to 270, the gateway 100 operates in the normal mode in which the gateway 100 provides communication connection using a main frequency band, such as an ISM or OFDM frequency band, to the electronic devices 210 to 270 at operation S130. In the normal mode, the gateway 100 does not restrict the main frequency band to a particular band and allows the electronic devices 210 to 270 to communicate using a random band within the main frequency band.

On the contrary, when it is determined that communication interference occurs between the electronic devices 210 to 270, the gateway 100 splits the main frequency band into a plurality of sub-bands respectively corresponding to the electronic devices 210 to 270 at operation S140. The gateway 100 allocates the sub-bands to the respective electronic devices 210 to 270 at operation S150.

In an embodiment, the gateway 100 splits the main frequency band according to the number of electronic devices 210 to 270. For example, when the number of connected electronic devices 210 to 270 is eight, the gateway 100 splits the main frequency band into eight sub-bands and the respective sub-bands offer non-overlapping frequencies.

Here, the gateway 100 may provide the sub-bands with the same bandwidth. However, providing the sub-bands with the same bandwidth may be inefficient in terms of resource distribution since characteristics of the electronic devices 210 to 270 are not considered.

Thus, the gateway 100 may set a different bandwidth for the sub-bands for the electronic devices 210 to 270, respectively, which will be described later.

The gateway 100 may provide a communication connection through the sub-bands allocated to the respective electronic devices 210 to 270 at operation S160. Accordingly, the electronic devices 210 to 270 are enabled with a communication connection through the sub-bands allocated to the corresponding electronic devices 210 to 270. Since each sub-band has a non-overlapping frequency, communication interference between the electronic devices 210 to 270 is minimized.

Hereinafter, an example that the gateway 100 sets up each sub-band will be described with reference to FIG. 3.

FIG. 3 illustrates a sub-band allocation for each of a plurality of electronic devices, such as the electronic devices in the system of FIG. 1, according to an embodiment of the present disclosure.

Referring to FIG. 3, when seven electronic devices 210 to 270 are connected to the gateway 100, the gateway 100 splits a 2.4 GHz main frequency band into seven sub-bands corresponding to the respective electronic devices 210 to 270 in the band split mode.

Here, the gateway 100 determines a communication usage of each electronic device 210 to 270 and sets up a different width of each sub-band for the electronic device 210 to 270 based on the communication usage.

The communication usage of each electronic device 210 to 270 is a parameter obtained by quantifying an amount of resources each corresponding electronic device 210 to 270 uses for communication. For example, a number of data packets that the corresponding electronic device 210 to 270 transmits and receives or a communication traffic level of the electronic device 210 to 270. A higher communication traffic level of an electronic device 210 to 270 refers to a greater amount of communication data performed by the electronic device 210 to 270, which means a higher communication usage.

Communication traffic levels of the electronic devices 210 to 270 may be determined by the gateway 100 monitoring the electronic devices 210 to 270 for a certain period time. Alternatively, since the communication traffic levels of the electronic devices 210 to 270 may be generally different depending on device/model types of electronic devices 210 to 270, the gateway 100 may determine communication usage of a corresponding electronic device 210 to 270 based on a device kind of the electronic device 210 to 270.

For example, since a computer is generally used by a user to perform Internet-based operations, the gateway 100 may determine that the computer has the highest communication usage. Next, since a TV or a mobile phone basically connects to a network to provide various services, such as a Video On Demand (VOD) service, an Electronic Program Guide (EPG) service, an application download service, and the like, the gateway 100 may determine that the TV or the mobile phone has a relatively high level of communication usage.

Similarly, since a Blu-ray player, a refrigerator, an air conditioner, a vacuum cleaner, and the like has a relatively lower network usage than other devices, such as those mentioned above, the gateway 100 may determine these apparatuses have a relatively low level of communication usage.

When the determining of the communication usage of each electronic device 210 to 270 is completed, the gateway 100 splits the 2.4 GHz main frequency band into the sub-bands and allocates the sub-bands to the respective electronic devices 210 to 270.

In the embodiment of FIG. 3, the gateway 100 sets up broader widths of sub-bands for the second, third, and seventh electronic devices (220, 230 and 270) that are determined to have a relatively higher communication usage than those of sub-bands for the first, fourth, fifth and sixth electronic devices (210, 240, 250 and 260) determined to have a relatively low communication usage.

For example, the gateway 100 sets up the sub-band for the computer, as a seventh electronic device 270, to have a 20 Hz bandwidth ranging from 2460 to 2480 Hz, the sub-band for the TV, as a second electronic device 220, to have a 10 Hz bandwidth ranging from 2410 to 2420 Hz, and the sub-band for the mobile phone, as a third electronic device 230, to have an 8 Hz bandwidth ranging from 2422 to 2430 Hz.

Meanwhile, the gateway 100 sets up the sub-band for the Blu-ray player, as a first electronic device 210, to have a 5 Hz bandwidth ranging from 2400 to 2405 Hz, the sub-band for the refrigerator, as a fourth electronic device 240, to have a 5 Hz bandwidth ranging from 2435 to 2440 Hz, the sub-band for the vacuum cleaner, as a sixth electronic device 260, to have a 5 Hz bandwidth ranging from 2450 to 2455 Hz, and the sub-band for the air conditioner, as a fifth electronic device 250, to have a 3 Hz bandwidth ranging from 2442 to 2445 Hz.

In this way, the gateway 100 sets up the broader widths of sub-bands for the electronic devices 220, 230 and 270 with a relatively high communication usage, thereby enabling smooth communications of the electronic devices 220, 230 and 270 and improving efficiency of resources.

When allocation of the sub-bands is completed, the gateway 100 provides communication connection so that the electronic devices 210 to 270 perform communications through the respective allocated sub-bands. That is, the sub-band ranging from 2460 to 2480 Hz allows only the seventh electronic device 270 to communicate, while the sub-band ranging from 2410 to 2420 Hz allows only the second electronic device 220 to communicate.

Here, the gateway 100 spaces the sub-bands several Hz apart, thereby minimizing communication interference between the electronic devices 210 to 270 using the respective sub-bands.

Meanwhile, when a new electronic device is connected while the gateway 100 is operating in the band split mode, the gateway 100 performs the process of the band split mode again, thereby splitting and allocating the main frequency band for all electronic devices 210 to 270 including the newly connected electronic device.

In the system 1, any one electronic device, for example, the third electronic device 230, may no longer be within the communication range of the gateway 100 operating in the band split mode. In this case, since the gateway 100 is not able to provide a communication connection to the third electronic device 230, allocation of the sub-band to the third electronic device 230 is canceled. Thus, the third electronic device 230 may connect to a different gateway in the normal mode for communication.

Figure 4:
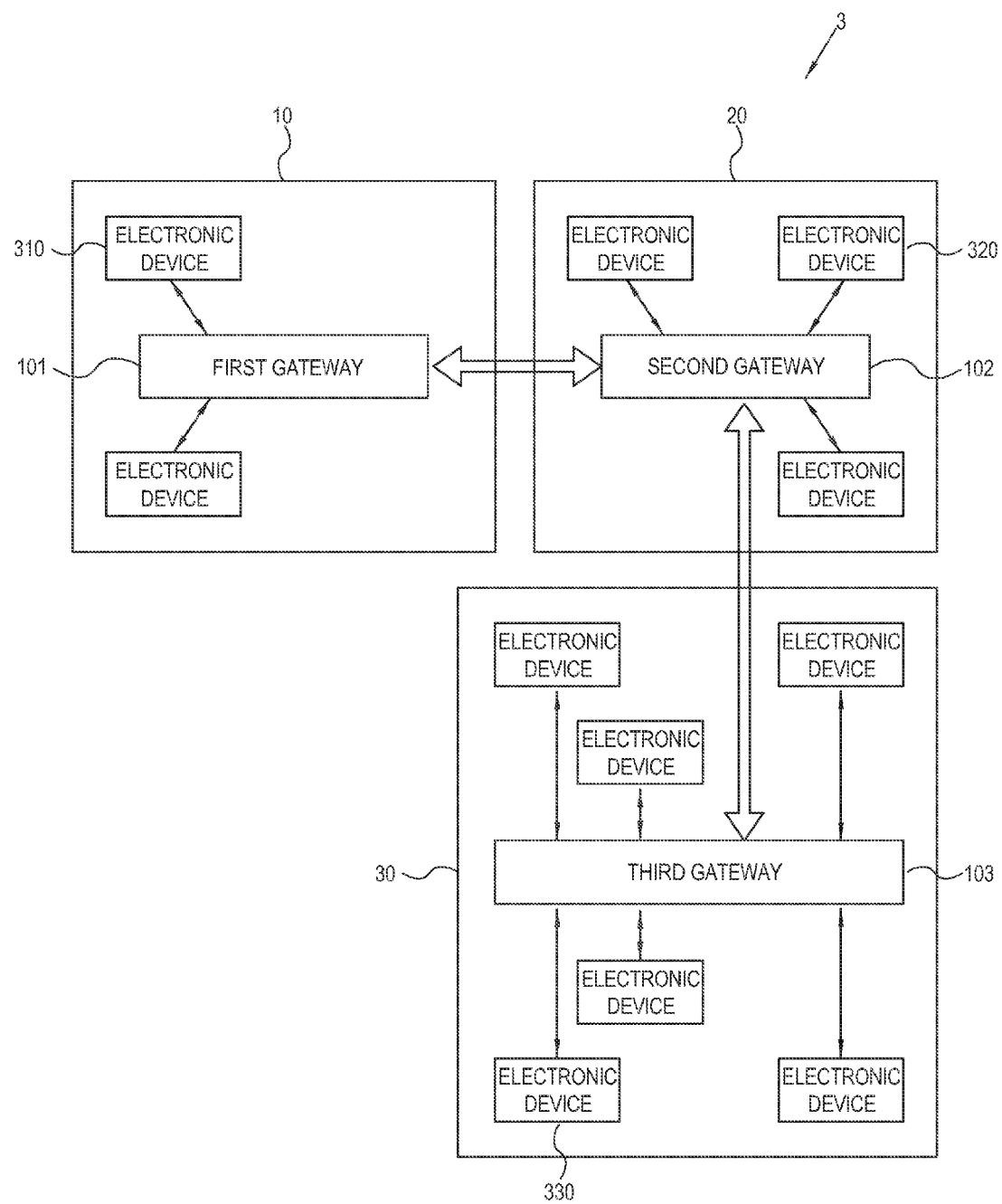
FIG. 4 illustrates a wireless network system according to an embodiment of the present disclosure.

FIG. 4 is a wireless network system according to an embodiment of the present disclosure.

Referring to FIG. 4, the wireless network system 3 includes a plurality of gateways 101, 102 and 103 capable of communicating with each other, wherein the gateways 101, 102 and 103 have communication ranges 10, 20 and 30 for communication connection, respectively.

The first gateway 101 provides communication connection to electronic devices 310 within the first communication range 10. The second gateway 102 provides communication connection to electronic devices 320 within the second communication range 20. And the third gateway 103 provides communication connection to electronic devices 330 within the third communication range 30.

When the communication ranges 10, 20 and 30 are adjacent to each other, communication interference between the electronic devices 310, 320 and 330 located in the different communication ranges 10, 20 and 30 may occur while the gateways 101, 102 and 103 provide communication connection in the normal mode.

For example, the number of electronic devices 320 connected to the second gateway 102 for communications and the number of electronic devices 330 connected to the third gateway 103 for communications may be less than a threshold value for performing the band split mode. However, the second communication range 20 and the third communication range 30 are disposed adjacent to each other or partly overlap. As such, communication interference may occur between the electronic devices 320 connected to the second gateway 102 for communication and the electronic devices 330 connected to the third gateway 103 for communication.

Thus, the present embodiment discloses the following method.

When the plurality of gateways 101, 102 and 103 are connected to the other gateways 101, 102 and 103 for communications in the system 3 and it is determined that communication interference occurs in the entire system 3, the gateways 101, 102 and 103 perform the band split mode. For example, if a total number of electronic devices 310, 320 and 330 respectively connected to the gateways 101, 102 and 103 is greater than a threshold value, it is determined that communication interference occurs.

Accordingly, communication interference between the communication ranges 10, 20 and 30 may be minimized.

Meanwhile, when the total number of electronic devices 310, 320 and 330 respectively connected to the gateways 101, 102 and 103 is less than the threshold value while the band split mode is performed in the system 3, the gateways 101, 102 and 103 may switch to the normal mode. Because the normal mode and the band split mode have been described in the preceding description, they will not be described here for sake of convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A gateway apparatus for providing wireless communication, the gateway apparatus comprising:
    an interface to which a plurality of electronic devices within a first range connect in a wireless local area network environment; and
    at least one processor configured to:
        perform a communication using a main frequency band to each of the plurality of electronic devices so that each of the plurality of electronic devices connected to the interface is enabled for wireless communication,
        determine whether communication interference occurs between the plurality of electronic devices,
        split the main frequency band into a plurality of bands respectively corresponding to the plurality of electronic devices connected to the interface when it is determined that communication interference occurs between the plurality of electronic devices,
        allocate the split bands to each of the plurality of electronic devices, and
        perform the communication using the split bands to each of the plurality of electronic devices,
    wherein the split bands are set up to have non-overlapping frequencies, and
    wherein a number of the split bands is equal to a number of the plurality of electronic devices.

2. The gateway apparatus of claim 1, wherein the at least one processor is further configured to set up different widths of the split bands for the respective electronic devices based on communication usage of each electronic device.

3. The gateway apparatus of claim 2,
wherein the communication usage of each electronic device comprises a communication traffic level of the electronic device, and
wherein the at least one processor is further configured to set up a broader width of a split band for an electronic device with a relatively high communication traffic level than that of a split band for an electronic device with a relatively low communication traffic level.

4. The gateway apparatus of claim 1, wherein the at least one processor is further configured to determine that the communication interference occurs when a number of electronic devices connected to the interface is greater than a threshold value.

5. The gateway apparatus of claim 1,
wherein the interface is configured to communicate with at least one different gateway apparatus, and
wherein the at least one processor is further configured to determine that the communication interference occurs when a number of electronic devices connected to the interface and the at least one different gateway apparatus is greater than a threshold value.

6. The gateway apparatus of claim 1, wherein, when it is determined that the communication interference between the electronic devices does not occur while communication is performed through the split bands allocated to the electronic devices, the at least one processor is further configured to perform communication in a state that the allocation of the split bands is cancelled.

7. The gateway apparatus of claim 1, wherein, when a new electronic device is connected to the interface while communication is performed through the split bands allocated to the electronic devices, the at least one processor is further configured to split and allocate the frequency band again.

8. The gateway apparatus of claim 1, wherein the frequency band comprises an industrial, scientific and medical (ISM) radio band of 2.4 GHz or an orthogonal frequency division multiplexing (OFDM) frequency band of 5 GHz.

9. A network system comprising:
a plurality of electronic devices; and
a gateway apparatus configured to perform a communication in a wireless local area network environment using a main frequency band to each of the plurality of electronic devices within a first range so that each of the plurality of electronic devices is enabled for wireless communication,
wherein the gateway apparatus is further configured to:
determine whether communication interference occurs between the plurality of electronic devices,
split the main frequency band into a plurality of bands respectively corresponding to the plurality of electronic devices when it is determined that communication interference occurs between the plurality of electronic devices,
allocate the split bands to each of the plurality of electronic devices, and
perform the communication using the split bands to each of the plurality of electronic devices,
wherein the split bands are set up to have non-overlapping frequencies, and
wherein a number of the split bands is equal to a number of the plurality of electronic devices.

10. The network system of claim 9, wherein, when at least one of the plurality of electronic devices is no longer in the first range where the gateway apparatus performs the communication while the communications are carried out through the split bands, the allocation of the split bands is canceled and each of the remaining electronic devices within the first range performs a communication to a different gateway apparatus using the entire frequency band.

11. A method for providing wireless communication by a gateway apparatus, the method comprising:
performing a communication in a wireless local area network environment using a main frequency band to each of a plurality of electronic devices connected within a first range so that each of the plurality of electronic devices is enabled for wireless communication;
determining whether communication interference occurs between the plurality of electronic devices;
splitting the main frequency band into a plurality of bands respectively corresponding to the plurality of electronic devices when it is determined that communication interference occurs between the plurality of electronic devices;
allocating the split bands to each of the plurality of electronic devices, and
performing the communication using the split bands to each of the plurality of electronic devices,
wherein the split bands are set up to have non-overlapping frequencies, and
wherein a number of the split bands is equal to a number of the plurality of electronic devices.

12. The method of claim 11, wherein the splitting of the frequency band comprises setting up different widths of the split bands for the respective electronic devices based on communication usage of each electronic device.

13. The method of claim 12,
wherein the communication usage of the electronic device comprises a communication traffic level of the electronic device, and
wherein the setting up of the different widths of the split bands comprises setting up a broader width of a split band for an electronic device with a relatively high communication traffic level than that of a split band for an electronic device with a relatively low communication traffic level.

14. The method of claim 11, wherein it is determined that communication interference occurs between the electronic devices when a number of electronic devices connected within the first range is greater than a threshold value.

15. The method of claim 11,
wherein the gateway apparatus is able to communicate with at least one different gateway apparatus, and
wherein it is determined that communication interference occurs between the electronic devices when a number of electronic devices connected to the gateway apparatus and the at least one different gateway apparatus is greater than a threshold value.

16. The method of claim 11, wherein the controlling of the electronic devices to perform communications through the split bands comprises providing communication in a state that the allocation of the split bands is cancelled when it is determined that the communication interference between the electronic devices does not occur while communication is performed through the split bands allocated to the electronic devices.

17. The method of claim 11, wherein the controlling of the electronic devices to perform communications through the split bands comprises splitting and allocating the frequency band again when a new electronic device is connected while communication is performed through the split bands allocated to the electronic devices.

18. The method of claim 11, wherein the frequency band comprises an industrial, scientific and medical (ISM) radio band of 2.4 GHz or an orthogonal frequency division multiplexing (OFDM) frequency band of 5 GHz.

* * * * *